United States Patent
Bourqui et al.

(10) Patent No.: US 8,449,049 B2
(45) Date of Patent: May 28, 2013

(54) REDUNDANT HARDWARE ARCHITECTURE FOR THE POWER STAGE OF THE BRAKING SYSTEM OF A VEHICLE IN WHICH EACH OF THE WHEELS ARE CONNECTED TO AT LEAST ONE ROTARY ELECTRICAL MACHINE

(75) Inventors: Gerard Bourqui, Villars-sur-Glane (CH); Fabrice Cudre-Mauroux, Noreaz (CH); Jean-Louis Linda, La Tour-de-Treme (CH)

(73) Assignee: Michelin Recherche et Technique S.A., Granges-Paccot (CH)

( * ) Notice: Subject to any disclaimer, the term of this patent is extended or adjusted under 35 U.S.C. 154(b) by 634 days.

(21) Appl. No.: 12/306,591

(22) PCT Filed: Jun. 15, 2007

(86) PCT No.: PCT/EP2007/055967
§ 371 (c)(1),
(2), (4) Date: Dec. 24, 2008

(87) PCT Pub. No.: WO2008/000636
PCT Pub. Date: Jan. 3, 2008

(65) Prior Publication Data
US 2009/0272608 A1 Nov. 5, 2009

(30) Foreign Application Priority Data

Jun. 26, 2006 (FR) .................................. 06 06020

(51) Int. Cl.
*B60T 8/64* (2006.01)
(52) U.S. Cl.
USPC ........................................................ 303/151
(58) Field of Classification Search
USPC .. 303/20, 122.04, 122.05, 151, 152; 318/375, 318/376; 180/242, 65.1, 65.285; 903/930
See application file for complete search history.

(56) References Cited

U.S. PATENT DOCUMENTS

| | | | |
|---|---|---|---|
| 5,148,883 A * | 9/1992 | Tanaka et al. | 180/165 |
| 5,245,294 A | 9/1993 | Kumar | 324/677 |

(Continued)

FOREIGN PATENT DOCUMENTS

| | | |
|---|---|---|
| CN | 1561568 A | 1/2005 |
| DE | 197 37 871 A1 | 3/1999 |

(Continued)

OTHER PUBLICATIONS

PCT/EP2007/055967 International Search Report (Form PCT/ISA/210), mailed Oct. 19, 2007.

*Primary Examiner* — Robert A Siconolfi
*Assistant Examiner* — Stephen Bowes
(74) *Attorney, Agent, or Firm* — Fitzpatrick, Cella, Harper & Scinto (57) ABSTRACT

An electric braking system for a vehicle includes first and second sub-systems connected to each other by an electric line. The first sub-system, which includes a first dissipation device, controls braking in a first wheel set. The second sub-system, which includes a second dissipation device, controls braking in a second wheel set different from the first wheel set. The electric line is arranged such that:

- if the first dissipation device becomes inoperative, electrical power produced by the first sub-system is channeled towards the second dissipation device, and
- if the second dissipation device becomes inoperative, electrical power produced by the second sub-system is channeled towards the first dissipation device.

14 Claims, 4 Drawing Sheets

U.S. PATENT DOCUMENTS

| | | | |
|---|---|---|---|
| 5,343,971 A | | 9/1994 | Heidelberg et al. .......... 180/65.4 |
| 5,345,154 A | * | 9/1994 | King ................. 318/49 |
| 5,418,437 A | | 5/1995 | Couture et al. ............... 318/139 |
| 5,481,460 A | | 1/1996 | Masaki et al. ........... 364/424.07 |
| 5,549,172 A | | 8/1996 | Mutoh et al. ................. 180/65.1 |
| 5,589,743 A | * | 12/1996 | King ................. 318/139 |
| 5,810,454 A | | 9/1998 | Prinzler et al. .................. 303/20 |
| 5,954,407 A | | 9/1999 | Schramm et al. ............. 303/155 |
| 5,961,190 A | | 10/1999 | Brandmeier et al. ......... 303/152 |
| 5,973,463 A | * | 10/1999 | Okuda et al. ................. 318/430 |
| 6,081,081 A | | 6/2000 | Maisch ........................ 318/139 |
| 6,113,119 A | | 9/2000 | Laurent et al. ............. 280/142.1 |
| 6,157,887 A | | 12/2000 | Zittlau ............................ 701/70 |
| 6,244,675 B1 | | 6/2001 | Behrends et al. ............. 303/155 |
| 6,299,261 B1 | | 10/2001 | Weiberle et al. ................. 303/20 |
| 6,317,675 B1 | | 11/2001 | Stölzl et al. ..................... 701/76 |
| 6,345,225 B1 | | 2/2002 | Böhm et al. .................... 701/70 |
| 6,657,356 B2 | | 12/2003 | Laurent et al. ................ 310/254 |
| 6,685,281 B2 | | 2/2004 | MacGregor et al. .......... 303/123 |
| 6,756,710 B2 | | 6/2004 | Bourqui et al. ................. 310/44 |
| 6,880,654 B2 | * | 4/2005 | Plishner ....................... 180/65.6 |
| 6,909,200 B2 | | 6/2005 | Bouchon ..................... 307/10.1 |
| 7,023,224 B2 | | 4/2006 | Ansari et al. ................... 324/691 |
| 7,096,098 B2 | | 8/2006 | Auguet et al. .................. 701/22 |
| 7,096,985 B2 | | 8/2006 | Charaudeau et al. ........ 180/65.2 |
| 7,359,786 B2 | | 4/2008 | Lindqvist ........................ 701/70 |
| 7,439,711 B2 | | 10/2008 | Bolton .......................... 320/166 |
| 7,848,857 B2 | | 12/2010 | Nasr et al. ....................... 701/22 |
| 2002/0021045 A1 | | 2/2002 | Hada et al. ................. 303/113.1 |
| 2003/0030322 A1 | | 2/2003 | Yokoyama et al. ...... 303/122.04 |
| 2005/0225165 A1 | | 10/2005 | Naik et al. ...................... 303/20 |
| 2006/0061213 A1 | | 3/2006 | Michalko ...................... 307/9.1 |
| 2010/0065386 A1 | | 3/2010 | Bourqui ........................ 188/159 |

FOREIGN PATENT DOCUMENTS

| | | |
|---|---|---|
| DE | 199 37 159 A1 | 2/2001 |
| EP | 0 083 557 A2 | 7/1983 |
| EP | 0 878 332 A1 | 11/1998 |
| EP | 1 026 060 A2 | 8/2000 |
| EP | 1 541 437 A2 | 6/2005 |
| FR | 2 776 966 A1 | 10/1999 |
| FR | 2 850 071 A1 | 7/2004 |
| WO | WO 03/030336 A1 | 4/2003 |
| WO | WO 03/065546 A2 | 8/2003 |
| WO | WO 2004/071800 A1 | 8/2004 |
| WO | WO 2005/110829 A1 | 11/2005 |
| WO | WO 2007/107576 A1 | 9/2007 |

* cited by examiner

REDUNDANT HARDWARE ARCHITECTURE FOR THE POWER STAGE OF THE BRAKING SYSTEM OF A VEHICLE IN WHICH EACH OF THE WHEELS ARE CONNECTED TO AT LEAST ONE ROTARY ELECTRICAL MACHINE

FIELD OF THE INVENTION

The present invention relates to road vehicles. It relates in particular to braking systems of a road vehicle, which systems use electric traction.

Electric vehicles include vehicles in which the electrical energy necessary for displacement thereof is stored in batteries and vehicles in which the electrical energy is produced on board, by a thermal engine driving a generator or by a fuel cell. Traction of the vehicle is ensured by one or more electric machines. Braking of the vehicle is ensured by a conventional mechanical braking system.

However, since an electric machine is reversible, it may also be used as an electric generator during the vehicle braking phases and in this case it converts the mechanical braking energy into electrical energy which the vehicle has to absorb, optionally by thermal dissipation. This operating mode is often called "electric braking" or "regenerative braking". For a brief history of the technical development of electric vehicles the interested party may consult international (PCT) patent application publication WO 2004/071800. Mention may also be made of U.S. Pat. No. 5,245,294 which addresses the particular case of electric vehicles powered by overhead catenary cables in contact with a stationary electrical line that forms part of a network to which a number of vehicles all circulating at the same time but at different points are connected. In this particular case, upon braking, it is possible to return electrical power to the network because it can be consumed by other vehicles which are not undergoing electric braking at that same instant. This clearly cannot be done with autonomous electric vehicles that form an electrical system isolated from their environment, such as passenger vehicles for example.

In practice, electric machines function as generators so as to ensure moderate deceleration of the vehicle, to recover the energy as far as possible and store it in electrical accumulators, or indeed to dissipate it in order to reduce the stress suffered by the mechanical brakes of the vehicle. The main braking of a vehicle is ensured in effect by hydraulically controlled mechanical brakes, generally in assisted manner, and these days most frequently provided with an anti-lock function commonly known as "ABS". Braking is a crucial vehicle safety function. Mechanical brakes have considerable power, sufficient to cause a wheel to lock, the power being limited by the anti-lock function, in association with maximum grip. To ensure passenger safety, the braking system of a passenger vehicle is generally capable of ensuring deceleration of the order of 1 "g", g being the unit of acceleration for which the value "1" corresponds to the earth's gravity. Further, the braking system of a passenger vehicle is usually generally laid out as two separate hydraulic circuits, as described, for example, in U.S. Patent Application Publication 2002/0021045.

Furthermore, in an electric traction vehicle, it is particularly worthwhile incorporating the electric machine in the wheel, because this does away with mechanical shafts and offers greater latitude with regard to the general architecture of the vehicle. A plurality of arrangements for incorporating electric machines into wheels are known from the prior art. International (PCT) patent application publication WO 2003/065546 proposes arranging four electric machines transmitting their torque to the wheel by means of a planetary gear train. Patent EP 0878332 discloses a ground contact system which incorporates both the vertical suspension of the wheel within the latter and a rotary electric machine used for traction. There is a reduction stage between the wheel and the electric machine, the latter being meshed with a toothed wheel coaxial with the wheel. Of course, the wheel comprises a disc brake so as to ensure the service braking function. Furthermore, the ground contact system comprises a pivot so as to allow turning of the wheel. All the mechanical functions of a ground contact system are thus incorporated into the wheel.

The invention relates to electric braking systems for road vehicles that form a self-contained electrical system isolated from the environment, equipped with wheels which are each connected for rotation to at least one rotary electric machine, each rotary electric machine cooperating with a single wheel. With such an architecture, it is possible to give the electric braking system a predominant role, with regard both to power and to control of vehicle stability (functions known as ABS and ESP) since it is possible to control selectively the wheel torque at each of the wheels via the control system of the rotary electric machine(s) associated therewith. For this purpose electric braking must also be extremely reliable.

The object of the present invention is to improve the reliability of electric braking systems for electric traction vehicles. In particular, the object is to propose an architecture for an electric braking system which makes it possible to eliminate the mechanical brakes and to ensure the service braking function solely electrically.

BRIEF DESCRIPTION OF THE INVENTION

A braking system is described below, in which it is possible to distinguish:
- a power stage in which flow the electrical power necessary for traction and the electrical power generated by electric braking,
- a low-voltage electrical supply stage for supplying electronics for controlling and driving power elements, and
- a flow stage for the signals for controlling vehicle braking.

An architecture is proposed below in which each of these stages exhibits a certain level of redundancy. The proposed redundancies for each of the stages may each be used alone or in combination with another. Of course, the level of safety is raised by adding together all the proposed redundancies.

The present application deals as a matter of priority with the power stage. A plurality of rotary electric machines are used, at least two and preferably one per driving wheel, this already providing a certain level of redundancy. Furthermore, preferably, the dissipation installation comprises two electronic dissipation modules and two electrical dissipation resistors in order always to offer a certain deceleration capacity in the event of breakdown of a resistor or its control module. This forms two sub-systems arranged as indicated below.

According to the invention, an electric braking system for a road vehicle, of which at least two wheels are each connected for rotation to at least one rotary electric machine, each rotary electric machine cooperating with a single wheel, at least one electronic wheel control module controlling the electric machine(s) of one and the same wheel, each electronic control module making it possible to impart selectively to the wheel in question a control torque of determined amplitude and sign, in such a way that the wheel in question imparts to the vehicle a drive force or a braking force in accordance with the determined control torque, is characterised in that it comprises at least two sub-systems connected to a central electric line, each of the sub-systems comprising:
part of the wheels,
the electronic control modules associated with each wheel of the part,
a dissipation device controlled by an electronic dissipation module, and
an overcurrent protection device capable of electrically isolating the sub-system from the central electric line.

In one embodiment for a four-wheeled vehicle, preferably each of the wheels is mechanically connected to its own rotary electric machine(s), each of the sub-systems comprising two of the wheels. Preferably, each sub-system groups together the wheels of the vehicle disposed diagonally at opposite corners of the vehicle. It will be seen that this solution offers greater safety than the double hydraulic braking circuits commonly used in motor vehicles.

Furthermore, very advantageously, the low-voltage electrical supply stage for supplying electronics for controlling and driving power elements comprises two independent voltage sources. The low-voltage electrical supply stage comprises a first low-voltage electrical supply and at least one second low-voltage electrical supply, the first supply and the second supply being interconnected by a low-voltage electric line comprising a first section and a second section, the first and second sections being connected by a device that electrically separates the two sections, capable of interrupting the interconnection on demand in the event of one of them experiencing an undervoltage or an overcurrent, each electronic wheel control module of one of the sub-systems being supplied by the first section and each electronic wheel control module of the other of the sub-systems being supplied by the second section.

The first supply consists for example of a voltage converter connected to the central electric line. The electrical energy on this central line may originate either from a main source, such as for example a fuel cell, or from an electrical energy storage device, or from braking energy reused in real time. There is thus also a redundancy of energy sources. The second supply consists for example of a low-voltage battery, dedicated to this low-voltage electrical supply. Of course, it is possible to use for this second voltage source a second voltage converter itself also connected to the central line or alternatively directly to the storage bank.

Finally, the vehicle braking control signal flow stage is constructed around two sensors connected mechanically, and preferably separately, to a braking control at the disposal of a driver, the sensors being exploited in a totally different manner as explained below.

It should also be pointed out that, preferably, to keep the vehicle immobile, a mechanical brake device is installed which is commonly known as a parking brake. However, such a device is not designed for braking the vehicle but only for keeping it stopped, preferably even on very considerable slopes. Thus, the system according to the invention comprises, associated with one wheel at least, a mechanical wheel braking device controlled solely by a parking brake control. Preferably, the parking brake device is controlled by an electrical actuator controlled by a braking control unit which can only be activated below a longitudinal speed threshold of the vehicle, the threshold being for example less than 10 km/h.

BRIEF DESCRIPTION OF THE FIGURES

Other objectives and advantages of the invention will become clearly apparent from the description which follows of a preferred but non-limiting embodiment, illustrated by the following Figures, in which.

DESCRIPTIONS OF EMBODIMENTS OF THE INVENTION

Figure 1:
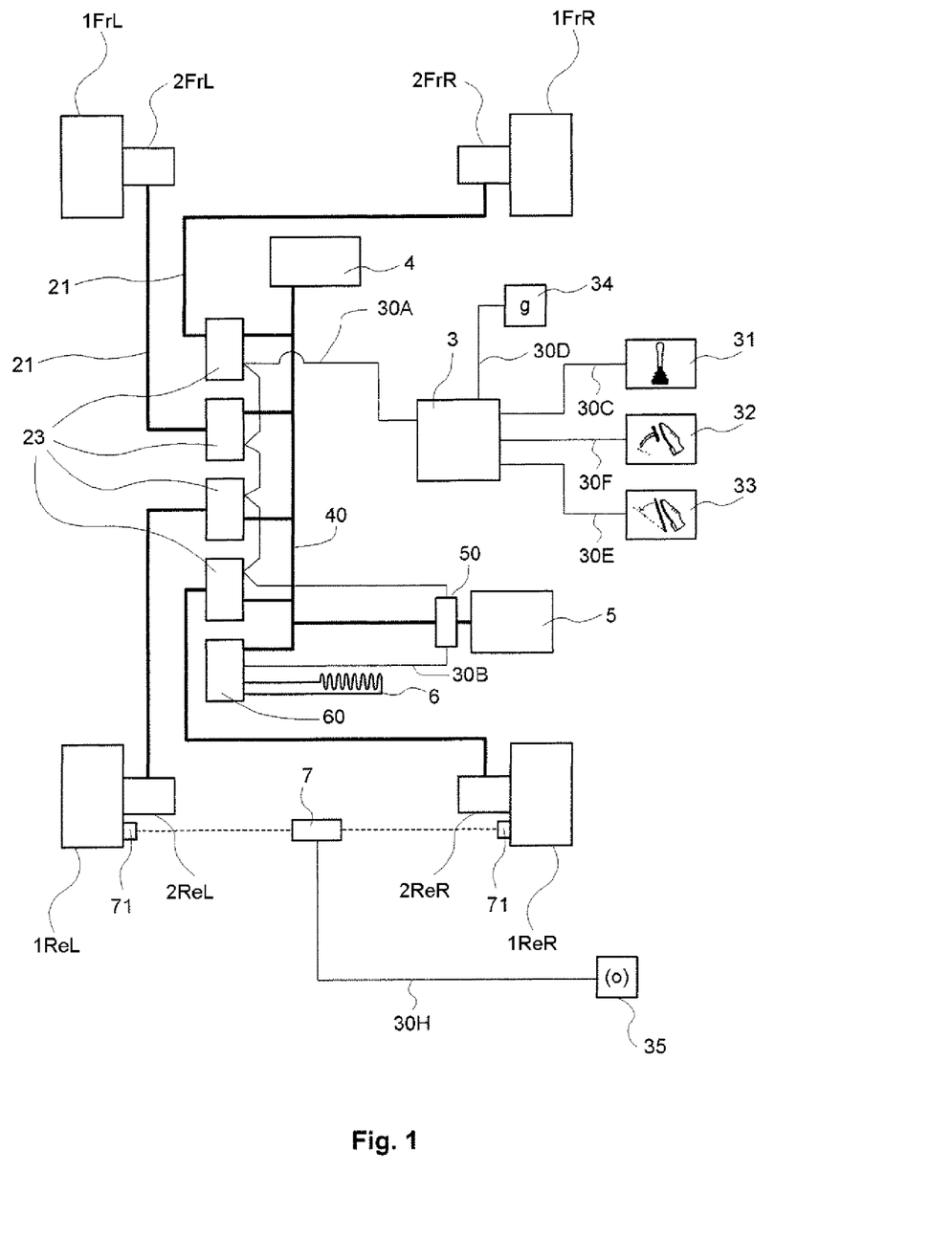
FIG. 1 is a schematic representation of a braking system of a four-wheeled vehicle, with on-board electrical energy production.

FIG. 1 is a schematic representation of a vehicle with four wheels $1_{FrL}$, $1_{FrR}$, $1_{ReL}$ and $1_{ReR}$. The wheels are designated $1_{FrL}$ for the left-hand front wheel, $1_{FrR}$ for the right-hand front wheel, $1_{ReL}$ for the left-hand rear wheel and $1_{ReR}$ for the right-hand rear wheel. Each wheel is equipped with an electric machine which is coupled mechanically thereto. The electric machines $2_{FrL}$, $2_{FrR}$, $2_{ReL}$ and $2_{ReR}$ are shown. Below, the suffixes specifically denoting the position of the wheel 1 or of the electric machine 2 in the vehicle will be used only if they contribute something to the clarity of the explanation. The electric traction machines 2 are three-phase synchronous machines, equipped with an angular position sensor of the resolver type, and are controlled by the electronic wheel control modules 23 to which they are connected by electrical power lines 21. The electronic wheel control modules 23 are designed to control the electric machines with regard to torque. As a result, the electric machines may be used as motors and as generators. Each of the rear wheels $1_{ReL}$ and $1_{ReR}$ is additionally equipped with a mechanical braking device 71 for the wheel controlled by an electrical actuator 7 controlled by a braking control unit.

In one particularly advantageous embodiment of the invention, none of the wheels of the vehicle comprises a mechanical service brake. Whatever the amplitude of the braking control signal, i.e. even for the most intense braking, braking is ensured electrically, i.e. by using the electric machines as generators. Each wheel comprises one or more dedicated electric machines so as to be able to generate a braking force selectively on each wheel, which could not be done with an electric machine common to a plurality of wheels, for example the wheels on one axle, because in this case there would be a mechanical transmission and a differential between the wheels. The electric machines are suitably dimensioned to impart to each wheel the greatest possible braking force.

Of course, the system includes means capable of absorbing elevated electrical power, which for example leads to the installation of one or more electrical dissipation resistors which are cooled effectively, for example by water circulation, the known electrical accumulators not being capable of absorbing the electrical power produced by emergency braking or not being capable of absorbing all the electrical energy produced by prolonged braking, unless the installed capacity is such that it would make the weight of the vehicle truly prohibitive. Thus the invention makes it possible to form a self-contained electrical system isolated from the environment, with no exchange of electrical power with the outside of the vehicle, which can therefore be applied to motor vehicles, an electric braking system application that is far more difficult than the case of vehicles connected to an electrical network, such as trains or urban trams.

Numerous arrangements are possible for arranging an electric machine coupled mechanically to the wheel. It should be noted, however, that it is advantageous to provide quite considerable gearing down, for example at least equal to 10 and indeed preferably greater than 15, so that the electric machine is not too bulky. It is possible to install an electric machine coaxially with the wheel, the mechanical link being ensured by a planetary gear train to provide the necessary gearing down. It is also possible to adopt a configuration of the type described in patent application EP 0878332, preferably by adding a mechanical gearing down stage. It is also possible to choose to provide a plurality of electric machines, the torques of which are added together. In this case, an electronic wheel module may control in parallel a plurality of electric machines installed in one and the same wheel. With regard to the installation of a plurality of electric machines in one wheel, it is possible to consult, for example, patent application WO 2003/065546 and patent application FR 2776966.

The invention is illustrated as applied to a vehicle ensuring on-board production of electrical energy. A fuel cell 4 is illustrated which supplies an electric current over a central electric line 40. Of course, any other means of supplying electrical energy may be used, such as for example batteries. Also shown is an electrical energy storage device consisting in this example of a bank of supercapacitors 5, connected to the central electric line 40 by an electronic regeneration module 50. An electrical dissipation resistor 6 is shown, preferably immersed in a heat-transfer liquid dissipating the heat towards an exchanger (not shown), constituting an energy absorption device capable of absorbing the electrical energy produced by all the electric machines during braking. The dissipation resistor 6 is connected to the central electric line 40 by an electronic dissipation module 60.

A central unit 3 manages various functions, including the vehicle's electric traction system. The central unit 3 interacts with all the electronic wheel control modules 23 as well as with the electronic regeneration module 50 via the electric lines 30A (CAN Bus®). The central unit 3 also interacts with an acceleration control 33 via an electric line 30E, with a braking control 32 (service brakes) via an electric line 30F, and with a control 31 selecting forward or reverse travel via an electric line 30C. This makes it possible to take account of the intentions of the driver. The central unit 3 also interacts with a longitudinal acceleration sensor 34 via an electric line 30D. Finally, the electronic regeneration module 50 interacts with the electronic dissipation module 60 via an electric line 30B.

The central unit 3 ensures management of vehicle longitudinal displacement. The central unit 3 controls all of the electronic wheel control modules 23. The central unit 3 has a vehicle braking operating mode activated by a vehicle braking control signal of given amplitude representative of the total braking force desired for the vehicle. In braking mode, whatever the amplitude of the braking control signal, the central unit 3 controls all of the electronic wheel control modules 23 in such a way that the sum of the longitudinal forces of all of the wheels 1 originating from the rotary electric machines is a function of the amplitude of the braking control signal. In other words, there is no mechanical service brake; the electric braking system described is the service brake for the vehicle.

Also shown is a parking brake control 35. The actuator 7 of the mechanical wheel braking device is controlled via an electric line 30H solely by this parking brake control 35, and absolutely not by the braking control 32. Preferably, in order to avoid any deterioration of the mechanical braking devices 71 designed solely to keep the vehicle immobile and whose capacity for dissipating heat is thus very limited, the parking brake control unit can only be activated below quite a low longitudinal speed threshold of the vehicle, for example lower than 10 km/h.

There will now follow an explanation of operation of the system according to the invention.

When the driver selects forward travel using the control 31 and actuates the accelerator pedal 33, the central unit 3 instructs the electronic wheel control modules 23 to supply the electric machines 2 by drawing electrical energy from the central electric line 40. The latter is supplied by the fuel cell 4 and/or the bank of supercapacitors 5, depending on the state of charge thereof and under the control of the central unit 3. The vehicle moves forwards. The electric machines 2 convert the electrical energy into mechanical traction energy. The power used depends in particular on the position of the acceleration control 33.

When the driver actuates the brake pedal 32, the central unit 3 passes into braking mode. From the driver's action on the brake pedal 32, the central unit 3 calculates a value for the braking control signal. Whatever the amplitude of the braking control signal, the central unit 3 controls all of the electronic wheel control modules 23 in such a way that the sum of the longitudinal forces of all the wheels 1 is proportional to the amplitude of the braking control signal. The rotary electric machines 2 then convert mechanical rotation energy into electrical energy.

Depending on the management strategy for the electrical energy programmed in the electronic regeneration module 50, the latter distributes the braking energy so as to recharge the bank of supercapacitors 5 and/or controls the electronic dissipation module 60 so as to dissipate the energy in the electrical dissipation resistor 6. It will be readily understood that, when the storage means such as the bank of supercapacitors 5 are saturated, the entirety of the energy must be dissipated. Furthermore, the power of the storage means may be limited, that is to say the charging speed of the storage means may for example correspond to light braking, as is commonly expected of a thermal engine (known as the "engine brake"). Beyond this level of braking, the electrical power produced is then directed towards the dissipation means.

In order to ensure operating safety of the vehicle, the electrical dissipation resistor 6 is dimensioned and cooled in such a way that the entirety of the electrical energy produced during emergency braking operations, which are the most violent, may be dissipated. In fact, it is advisable to design the system consisting of the rotary electric machines 2, the electronic wheel control modules 23, the central electric line 40, the electronic dissipation module 60 and the electrical dissipation resistor 6 according to criteria of similar stringency to those applied to mechanical braking systems.

Preferably, all the electrical dissipation resistors 6 form an energy absorption device of a power greater than 500 kW per tonne of vehicle. In effect, if F is the force applied to the vehicle to brake it, if its mass is M (kg) and its speed is V (m/sec) and if $\gamma$ is the acceleration (m/sec2), the result is $F=M*\gamma$ and $P=F*V=M*(\gamma*V)$; assuming that maximum deceleration is 1 g, at 130 km/h the power per tonne of vehicle is approximately 350 kW and at 160 km/h it is approximately 500 kW. The person skilled in the art will readily proportion the power of the energy absorption device as a function of the characteristics of the vehicle which he/she intends to construct.

Thus, as in the example illustrating the invention, there are two sub-systems each having an electrical dissipation resistor, each of these electrical dissipation resistors 6A and 6B being of a power greater than 250*M/1000 kW.

When the driver selects reverse travel, the central unit 3 instructs the electronic wheel control modules 23 to reverse operation of the rotary electric machines 2, including in the event of braking.

A description will now follow of how it is possible to establish an anti-wheel-lock function.

Since the electrical traction machines 2 are equipped with an angular position sensor of the resolver type, and each wheel 1 has its own rotary electric machine 2, a rotational speed sensor is thus provided for each wheel. It is thus advantageously possible to equip the system according to the invention with a device for controlling the slip of each wheel, in which, in braking mode (or even as soon as the driver lifts his foot off the accelerator pedal in order to instigate what is commonly known as "engine braking"), the control torque of a wheel is reduced when the slip control device detects slip of the wheel in question. It is possible, for example, to analyse in real time the signal which the rotational speed sensor of each wheel outputs and to deduce from a marked variation (deceleration) the beginnings of locking. It is possible to calculate in real time the derivative of the rotational speed signal of each wheel, thus to obtain a signal representative of the acceleration/deceleration of each wheel and to compare the latter with a signal giving the real acceleration/deceleration of the vehicle if an appropriate sensor is available. This is the longitudinal acceleration sensor 34 already introduced above, or it results from the processing of a plurality of signals allowing estimation of the real acceleration/deceleration of the vehicle. Consequently, the central unit 3 may instruct the electronic wheel control modules 23 to reduce the wheel control torque (selectively by wheel) when the slip control device detects slip of the wheel in question. It should be noted that this reduction in torque may be managed directly by the electronic wheel control modules, which may react in real time relative to the speed and acceleration measured at the wheel, the central unit transmitting for example maximum speed and acceleration instructions to be complied with.

In conclusion, it should be pointed out that the absence of a conventional braking member (c.f. disc and calipers in European patent application publication EP 0878332) substantially simplifies not only the architecture of the vehicle equipped with a system according to the invention, but also maintenance thereof by eliminating periodic operations involving replacement of the pads and discs. Among the advantages achieved by eliminating conventional hydraulic braking members, mention may additionally be made of the elimination of any residual friction of the pads (it is known that this friction consumes a not inconsiderable part of the energy necessary for operation of a vehicle with conventional braking). Another advantage which may be noted is the elimination of thermal stresses brought about at the ground contact system by the conventional hydraulic braking members and the elimination of the nuisance associated with the dust produced by wear of the pads and of the discs.

The above description is of a traction system for a motor vehicle in which none of the wheels is equipped with mechanical brakes. The deceleration capacity of the vehicle stems from operating rotary electric machines as generators, the latter being designed so as to be able to cause each of the wheels of the vehicle to lock, that is to say they are capable of providing sufficient braking torque.

The remainder of the description illustrates a particular non-limiting example which makes it possible to construct a system having sufficient hardware redundancy to be able to ensure a very high level of safety in the braking system of the vehicle.

Figure 2:
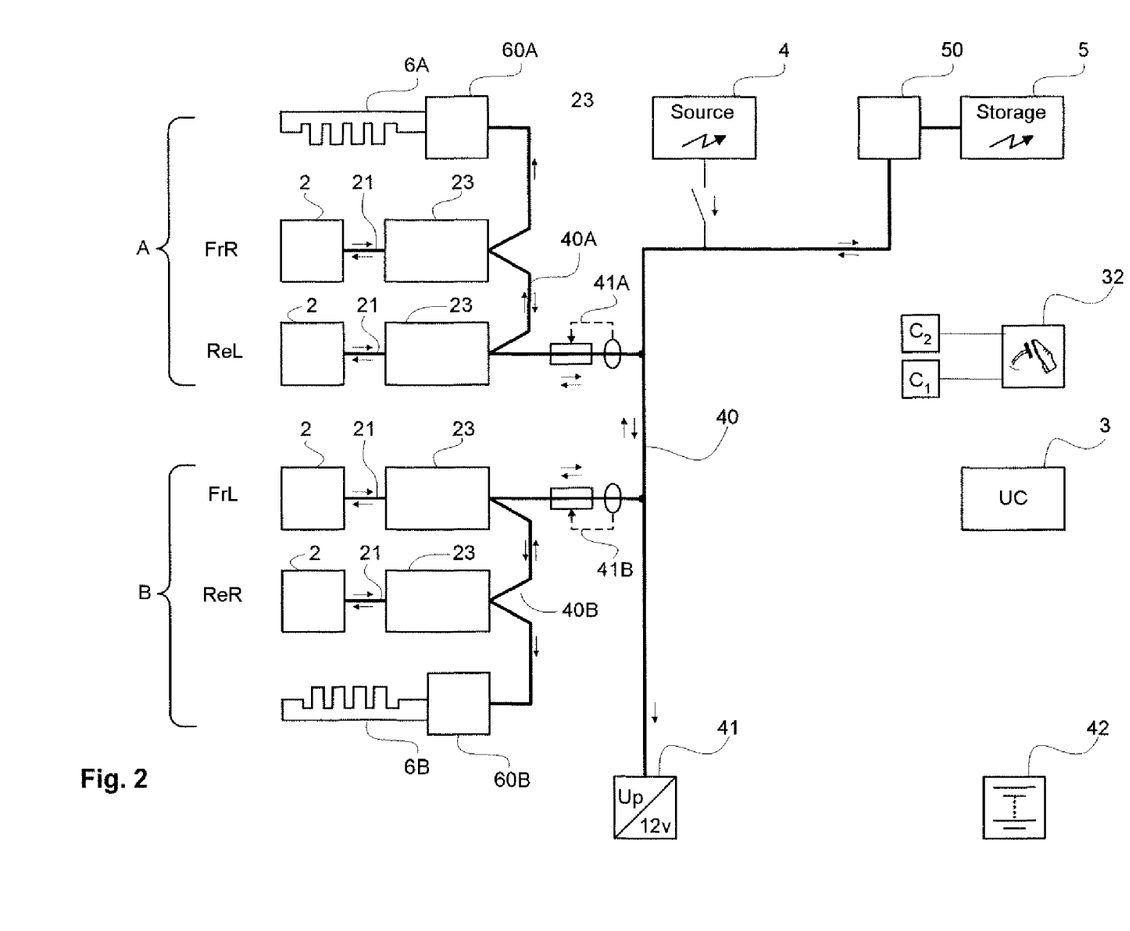
FIG. 2 is a diagram detailing the power level organised to exhibit a certain hardware redundancy.

In FIG. 2, it can be seen that the electric braking system comprises two sub-systems (A and B) connected to the central electric line 40, via an overcurrent protection device 41A and 41B, respectively, each of the sub-systems comprising two wheels each connected for rotation to at least one rotary electric machine 2 specific thereto. The right-hand front wheel and the left-hand rear wheel, or more precisely the rotary electric machines 2 and the electronic wheel control modules 23 associated therewith, form sub-system A. The left-hand front wheel and the right-hand rear wheel, or more precisely the rotary electric machines 2 and the electronic wheel control modules 23 associated therewith, form sub-system B. Each sub-system comprises an electrical dissipation resistor 6A or 6B respectively, each supplied by an electronic dissipation module 60A or 60B respectively.

If the various constituent elements of the traction system are examined with regard to the criterion of hardware redundancy, the rotary electric machines 2 incorporated into the wheels form a system which naturally exhibits redundancy since each of the wheels has its own electric machine. The control electronics of these machines, namely the electronic wheel control modules 23, likewise form a system which exhibits hardware redundancy since each of these electric machines 2 has its own control electronics.

During regenerative braking, each of the rotary electric machines 2 supplies electrical energy on the electrical power line 40 via the electronic wheel control modules 23. This energy may either be stored in accumulators such as the bank of supercapacitors 5 or be dissipated by the electrical power resistors 6A and 6B. During emergency braking, it is obviously impossible to count on the storage capacity of the accumulators, because the latter could very well already be at maximum charge and incapable of absorbing electrical energy. Consequently, the electrical resistor 6 is a member crucial to operational safety. Likewise, the electrical power line 40 is a crucial element for the operational safety of a fully electrical vehicle braking system. Various failure scenarios will be examined below.

FIG. 2 shows the main source of electrical energy, which, in this example of embodiment, is a fuel cell 4. The Figure also shows the accumulator battery allowing storage of the electrical energy, which, in this example of embodiment, is a bank of supercapacitors 5 and its electronic regeneration module 50. Finally, low-voltage electrical supply of the various electronic modules is ensured on the one hand by a voltage converter 41 allowing conversion of the voltage available on the electrical power line 40 into low voltage (for example 12 volts) used to supply the various control electronics, and on the other hand by a battery 42 such as a DC 12 volt battery used conventionally in a vehicle.

We have seen that, in order to ensure braking safety, the braking system is organised into two sub-systems, namely system A grouping together the right-hand front wheel and the left-hand rear wheel and system B grouping together the left-hand front wheel and the right-hand rear wheel. Sub-system A is connected to the power line 40 via an overcurrent protection device 41A. Sub-system B is connected to the power line 40 via an overcurrent protection device 41B. Each of the sub-systems thus comprises its own dissipation resistor 6A, 6B and each has its own control electronics 60A, 60B and is connected to the power line 40 via an overcurrent protection device 41A, 41B capable of electrically isolating the sub-system from the central electric line. At the opposite end to the power line 40, downstream of the device 41A, a section 40A of electrical power line is connected to the electronic wheel control module 23 associated with the left-hand rear wheel, to the electronic wheel control module 23 associated with the right-hand front wheel and finally to the electronic dissipation module 60A associated with the dissipation resistor 6A. The same is true of sub-system B.

In the event of damage to the power line 40 causing a break between the connection points of the overcurrent protection devices 41A and 41B, two sub-systems, systems A and B, remain which are independent of one another and which are each capable of ensuring electric braking of the vehicle. Each of these sub-systems has its own electrical dissipation resistor. Power stage hardware redundancy is thus provided.

The power stage may suffer other failures than a failure on the power line 40. It is possible, for example, for the section of the power line 40A ending at the electronic dissipation module 60A to be interrupted. In this case, the dissipation resistor 6A is out of circuit. The electrical power produced by sub-system A during electric braking may pass through the uninterrupted section of the electrical power line 40A and, via the overcurrent protection device 41A, pass back to the power line 40 and be channeled, via the power line 40B, towards the electrical dissipation resistor 6B. The electrical dissipation resistor 6B thus becomes common, in this case, to sub-system A and sub-system B. Whether a fault with the dissipation resistor 6A or a fault with the electronic dissipation module 60A is considered, the result is the same: this dissipation circuit becomes inoperative.

Even if the electrical dissipation power available is divided in two, in this case precisely, the deceleration capacity of the electric braking system remains considerable, being sufficient to ensure emergency braking. In effect, each of the electrical dissipation resistors 6 is immersed in a hydraulic cooling circuit. In the event of emergency braking, the energy produced by electric braking is sufficient to bring the cooling fluid to boiling point. All the same, as it is transformed into the vapour phase, the vaporised fluid is immediately replaced by cooling fluid in the liquid phase, which again washes against the resistor and the system continues to exhibit a certain capacity for heat dissipation. Furthermore, the cooling system exhibits a degree of temperature lag. Experiments performed by the applicant have demonstrated that, even with this scenario, the electric braking system remains considerably more powerful and effective than a hydraulic crosswise braking system such as those used in motor vehicles at the present time.

If the electrical power line 40A is interrupted between the electronic wheel control module 23 associated with the right-hand front wheel and the electronic wheel control module 23 associated with the left-hand rear wheel, then in this case the electrical dissipation resistor 6A remains available for the rotary electric machine 2 associated with the right-hand front wheel when it functions as a generator whereas the electrical dissipation resistor 6B is available for sub-system B and for the rotary electric machine 2 associated with the left-hand rear wheel, that is to say one of the rotary electric machines 2 of sub-system A. One 6B of the electrical dissipation resistors will receive higher electrical power than the other 6A. Operation is not optimal, but the configuration is less disadvantageous for the deceleration capacity of the vehicle than that explained in the previous paragraph.

If, for some reason, a failure causes opening of the overcurrent protection device 41A, thus isolating the sub-system A, which nonetheless remains capable of contributing to vehicle braking, then in this case also the braking capacities of the vehicle remain at maximum because the electrical dissipation resistors are designed so as to be able, overall, to ensure full deceleration of the vehicle even when the electrical energy accumulator, consisting here of the bank of supercapacitors 5, is at maximum charge. In this case, the situation is not one of breakdown of the electric braking system as regards maximum deceleration capacity. Admittedly, the situation is not optimal as regards general management, since in particular the possibility of regenerating energy is lost, but this is not detrimental to safety. Let us now consider a more serious fault such as a short circuit, for example, on the electrical power line 40A. This type of fault will cause the overcurrent protection device 41A to open, thus isolating the sub-system A which, in this instance, is assumed to be incapable of contributing to vehicle braking, and preventing the fault from affecting the operation of the sub-system B which therefore remains fully operational. Even in the event of this major fault, 50% of the total braking capacity is nonetheless retained. This is clearly not enough to allow braking with full deceleration, but the ability to slow the vehicle to a standstill under good conditions of safety is maintained.

If any one of the failures which have just been explained for sub-system A occurs in sub-system B, for reasons of symmetry, the electric braking safety conditions plainly remain identical. In conclusion, by organising the power stage in two independent sub-systems, system A and system B, each connected to the central electrical power line 40 of the vehicle by its own overcurrent protection device (devices 41A and 41B) and by equipping each of the sub-systems with its own electrical dissipation resistor, double hardware redundancy is provided, such that it is possible to ensure excellent safety conditions for electric braking of the vehicle.

Figure 3:
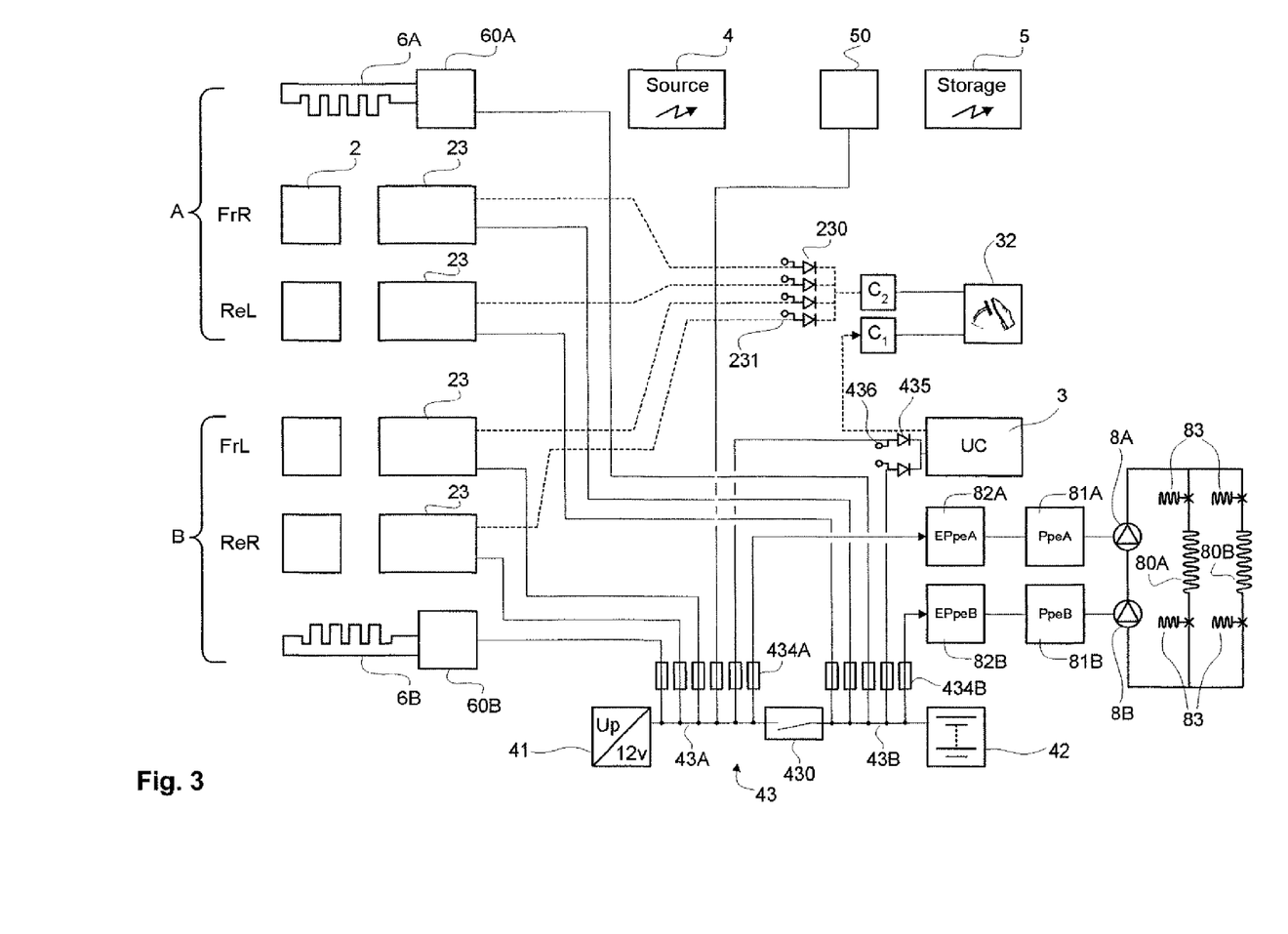
FIG. 3 details the low-voltage electrical supply level of the various control electronics.

The dissipation power of the electrical dissipation resistors 6A and 6B depends on good operation of the cooling system. In effect, they are immersed in a heat-transfer fluid. FIG. 3 is a schematic representation of the cooling circuit. It may be seen that the latter comprises 2 pumps 8A and 8B and 2 radiators 80A and 80B. The 2 pumps 8A and 8B are mounted in series and each is controlled by its own electric motor 81A and 81B respectively. Each of these electric motors is controlled by its own control electronics 82A and 82B. The radiators 80A and 80B are mounted in parallel and equipped with valves 83 which make it possible to isolate each of the radiators selectively in the event of leaks in one thereof. On the other hand, the pump and pump actuating motor assembly is designed in such a way that, if one of the pumps is out of order, the other pump is capable of ensuring a sufficient flow rate for the heat-transfer fluid despite the fact that the other pump is no longer functional.

A description will now be provided of the low-voltage electrical supply of the various control electronics and of the various auxiliaries, with reference to FIG. 3. This Figure shows the electronic dissipation modules 60A and 60B of the 2 electrical dissipation resistors 6A and 6B, the electronic wheel control modules 23 each associated with one of the four electric machines 2, and the electronic regeneration module 50 associated with the bank of supercapacitors 5. Also shown is the central unit 3, the control electronics 82A of one of the pumps of the cooling circuit and the control electronics 82B of the other one of the pumps of the cooling circuit. The brake pedal is assumed to be sufficiently safe as a result of its construction and is thus not duplicated. Two position sensors, C1 and C2, are each associated with the brake pedal and each supply a signal representing the command desired by the driver of the vehicle.

The redundancy for low-voltage electrical energy supply is designed as follows. Since there are provided, on the one hand, a voltage converter 41 connected to the electrical power line 40 and supplying a 12 volt direct voltage and, on the other hand, a battery 42 also supplying a 12 volt direct voltage, certain elements will be connected to the voltage converter 41 and other elements will be connected to the 12 volt battery as follows. A line 43 ensures interconnection between the voltage converter 41 and the battery 42. This line 43 comprises a first section 43A and a second section 43B, the first and second sections being connected via a device 430 that electrically separates the two sections, in the event of one of them experiencing an undervoltage or an overcurrent. Thus it may be seen that, in the nonlimiting embodiment illustrative of the invention, the two sections 43A and 43B are supplied at the same voltage. Certain elements are connected to the first section 43A, each via an overcurrent protection device 434A. Certain elements are connected to the section 43B, each via an overcurrent protection device 434B.

For example, to ensure good operation of the pumps of the cooling circuit, one of the motors 81A is connected to the first section 43A via its control electronics 82A. The other one of the motors 81B is connected to the second section 43B via its control electronics 82B. The control electronics of sub-system A, namely the electronic wheel control module 23 associated with the rotary electric machine 2 of the right-hand front wheel, the electronic wheel control module 23 associated with the rotary electric machine 2 of the left-hand rear wheel and the electronic dissipation module 60A of the dissipation resistor 6A are connected to the second section 43B whereas the same electronics of sub-system B are connected to the first section 43A.

The central unit 3 ensuring management of vehicle displacement, since it controls all the electronic wheel control modules 23, benefits from a double electrical connection. It is connected both to the first section 43A and the second section 43B, via a pair of diodes isolating the first and second sections. The central unit 3 is connected each time via a diode 435 so as to ensure continuity of electrical supply of the central unit 3, even in the event of breakdown of one of the 2 low voltage sources. Furthermore, a suitable circuit 436 monitors the presence of electrical voltage on each of the supply lines in order to send a fault signal in the event of breakdown of one of the two electrical supplies. The electronic regeneration module 50 associated with the bank of supercapacitors 5 is connected solely to the first section 43A. It should be noted that this type of double connection could also be used for all the electronics, in particular for the electronic wheel control modules 23.

In the event of an undervoltage or of an overcurrent resulting, for example, from a short circuit in one of the two sections 43A or 43B or directly inside one of the supplies 41 or 42, the electrical separation device 430 interrupts the connection between the two sections 43A and 43B in order to preserve the functionality of the fault-free section. It may therefore be seen that if, for any reason, a significant fault with the voltage converter 41 causes the electrical separation device 430 to interrupt the interconnection between the voltage converter 41 and the battery 42, the latter could continue with low-voltage supply of the control electronics associated with sub-system A and the central unit as well as one of the 2 pumps of the hydraulic cooling circuit. Conversely, in the case of a significant fault at the battery 42, the electrical separation device 430 can interrupt the interconnection and the voltage converter 41 can continue to supply sub-system B, the central unit and one of the pumps of the hydraulic cooling circuit. It may thus be seen that the architecture described makes it possible to maintain operation of one of the 2 sub-systems A or B and thus half of the vehicle braking power is still available. Of course, using the double connection of the low-voltage electronic supply for all the electronics means that full braking power will remain available even in this fault scenario.

A description will now follow of supply of the braking sensors C1 and C2, which are the first link in the braking control system. It should be remembered that the system according to the invention comprises a central unit 3 which controls all of the electronic wheel control modules 23. On the other hand, the system according to the invention comprises a braking control 32 available to a driver, the control being connected mechanically at least to a first sensor C1 outputting a vehicle braking control signal having a given amplitude representing the total braking force desired for the vehicle, and to a second sensor C2 outputting a vehicle braking control signal having a given amplitude representing the total braking force desired for the vehicle.

The architecture of the system according to the invention has allotted a different role to sensors C1 and C2. The sensor C1 is supplied with low-voltage electrical energy by the central unit 3. It outputs the control signal to the central unit 3 and the latter receives the braking control signal only from sensor C1 to create a first level of overall vehicle braking control signals. Let it be pointed out that the central unit 3 comprises the appropriate circuits for monitoring the presence of voltage on the line supplying the sensor C1, and the integrity of the control signal on the line 30F, so as to manage fault information concerning a fault on the conditioning circuit for the sensor C1. The second sensor C2 is supplied by the electronic wheel control modules 23 associated with each of the electric machines. The second sensor C2 outputs its control signal to each of the electronic wheel control modules 23. Of course, a diode 230 is implanted in the supply line between each of the control electronics 23 and the sensor C2. Furthermore, a suitable circuit 231, in each of wheel control modules 23, monitors the presence of electrical voltage on each of the four supply lines in order to send a fault signal in the event of breakdown of one of the four electrical supplies. In the following paragraph it will be seen that sensor C2 is directly associated with the wheel control electronics 23 and solely with the wheel control electronics 23.

It has just been seen that the low-voltage electrical supply stage comprises a first supply and at least one second supply, the first supply and the second supply being interconnected by an electric line 43 comprising a first section 43A and a second section 43B, the first and second sections being connected by a device 430 that electrically separates the two sections, capable of interrupting the interconnection on demand in the event of one of them experiencing an undervoltage or an overcurrent. The first sensor C1 is supplied by the same section as the central unit 3 and the second sensor C2 is supplied both by wheel control electronics 23 of one (A) of the sub-systems and by wheel control electronics 23 of the other (B) of the sub-systems via a pair of diodes isolating the supplies.

Figure 4:
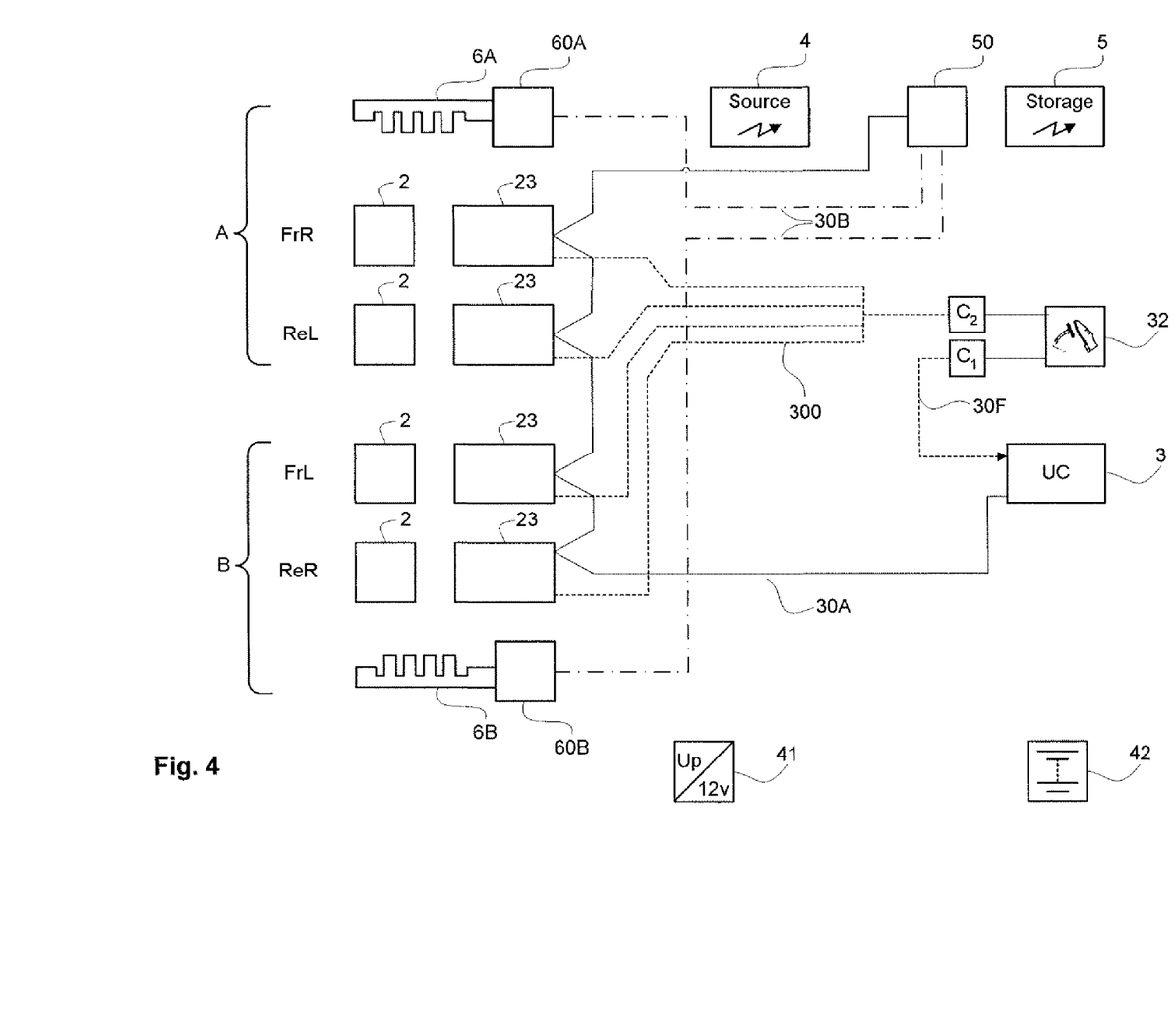
FIG. 4 details the level of the control lines between the control electronics of the various elements and the central unit.

In FIG. 4, it may be seen that the central unit 3 is interconnected with each of the electronic wheel control modules 23 and with the electronic regeneration module 50 by a CAN Bus® (Control Area Network, designated by reference numeral 30A) allowing the transfer of control instructions in computerised form. The central unit 3 is loaded with software suitable for being able to take into account all the desirable parameters in order to develop a braking control signal which is sent to the various electronics controlling the electric machines in accordance with the desired protocols for circulation through the CAN bus 30A. The central unit 3 sends the signal in cadence on the bus 30A with a period of the order of 10 to 20 ms, and each electronic wheel control module 23 monitors this period. If, because of malfunctioning of the CAN bus, of the central unit 3, or of the inbuilt software, or for any other reason, this period changes, a CAN communications fault data item is generated. Each of the electronic wheel control modules 23 additionally directly receives analogue signals output by the sensor C2, this time via analogue lines 300. Let it also be pointed out that each wheel control module 23 comprises the appropriate circuits for monitoring the integrity of the control signal on the line 300, so as to manage fault information in the event of a fault on the conditioning circuit for the sensor C2.

Finally, control lines 30B connect the electronic regeneration module 50 to the electronic dissipation modules 60A and 60B. In the event of a fault on the control lines 30B or at the electronic regeneration module 50, the electronic dissipation modules 60A and 60B retain the possibility of dissipating the braking power which automatically passes back to the power line 40 without receiving a command on line 30B. The sub-assemblies A and B thus remain fully operational for braking but without the possibility of storing energy, since, in the latter instance, the electronic regeneration module 50 is out of service.

To return to the creation of braking torques by the electric machines 2, control of the electric machines 2 is ensured directly by an electronic wheel control module 23 specific to each of the electric machines 2. The module is loaded with software suitable for controlling each electric machine with regard to torque depending on the control signals received. Each electronic wheel control module 23 receives braking control signals on the one hand on bus 30A and on the other hand on the analogue line 300 supplying the signal from sensor C2. Each electronic wheel control module 23 may thus compare at any moment the control signal supplied on bus 30A and the control signal supplied by the analogue line 300 and, within a certain tolerance margin for example of the order of 10 to 20% depending on what is determined experimentally, give priority to the braking control signal coming from bus 30A. This is the normal operating mode.

On the other hand if, due to malfunctioning of the central unit 3 or of the software established in the central unit 3, the braking control signal sent by the bus 30A was much lower than the braking control signal coming directly in analogue manner from sensor C2, priority may be given to the control signal coming from sensor C2 to ensure operational safety when braking the vehicle. It can be seen that the proposed architecture utilises differently the signals supplied by each of sensors C1 and C2. Sensor C1 is associated with the central unit 3 and makes it possible to calculate a first level overall braking signal. On the other hand, the control signal supplied by sensor C2 is supplied directly in analogue manner by suitable lines to the electronic wheel control modules 23. Overall coherence is ensured by comparing the various signals. The signal corresponding to the highest deceleration demand, within a selected tolerance margin, then takes priority. In this way, braking control safety is ensured even in the event of breakdown of the bus 30A, or of a section of the bus, or of any of the analogue lines 300 or 30F.

In addition to all the above, it is possible to establish a possibility of creating a braking signal predetermined by an emergency command by means for example of an emergency button at the disposal of the driver. This type of braking command is taken into account by the central unit 3, more precisely by the software established in the central unit 3, and is routed to the control electronics 23 of each of the electric machines by the CAN bus 30A. This may ensure operating safety during braking even if the brake pedal breaks off. Likewise, this may ensure operating safety during braking in the event of breakage of the 2 sensors or breakage of the fixing means of the 2 brake sensors C2 and C2. If only the mechanical connection of one of the 2 sensors C1 or C2 or one of the 2 sensors is faulty, operating safety during braking is of course ensured as explained in the previous paragraph. However, in this case it is possible, for example, to allow the journey to be brought to an end and, once the vehicle has stopped, to prevent it from starting again.

Finally, it should be pointed out that the hardware redundancy which has just been explained is preferably used in combination with software redundancy, advantageously both with regard to the software loaded in the central unit 3 and that loaded in the electronic wheel control modules 23. In this way, a high degree of safety is achieved for a fully electrical vehicle braking system.

The invention claimed is:

1. An electric braking system for a road vehicle that includes at least two wheels, each wheel being connected for rotation to a respective rotary electric machine, the electric braking system comprising:
   first and second sub-systems connected to a central electric line of the vehicle, the first sub-system controlling braking in a first subset of the at least two wheels, and the second sub-system controlling braking in a second subset of the at least two wheels, the second subset being different from the first subset,
   wherein the first sub-system includes:
      a first electronic wheel control module controlling a rotary electric machine of a wheel of the first subset, the first electronic wheel control module enabling a first control torque of a determined amplitude and sign to be imparted selectively to the wheel of the first subset, such that the wheel of the first subset imparts to the vehicle a drive force or a braking force in accordance with the first control torque, the first and second sub-systems being independent of each other, and
      a first dissipation device controlled by a first electronic dissipation module, the first dissipation device being connected to the first electronic wheel control module,
   wherein the second sub-system includes:
      a second electronic wheel control module controlling a rotary electric machine of a wheel of the second subset, the second electronic wheel control module enabling a second control torque of a determined amplitude and sign to be imparted selectively to the wheel of the second subset, such that the wheel of the second subset imparts to the vehicle a drive force or a braking force in accordance with the second control torque, and
      a second dissipation device controlled by a second electronic dissipation module, the second dissipation device being connected to the second electronic wheel control module,
   wherein the central electric line is arranged such that:
      if the first dissipation device becomes inoperative, electrical power produced by the first sub-system is channeled towards the second dissipation device, and
      if the second dissipation device becomes inoperative, electrical power produced by the second sub-system is channeled towards the first dissipation device,
   wherein a capacity of the first dissipation device is sufficient to process both the electric produced by the first sub-system and the electric power produced by the second sub-system to allow the electric braking system to retain full braking ability, and
   wherein a capacity of the second dissipation device is sufficient to process both the electric power produced by the first sub-system and the electric power produced by the second sub-system to allow the electric braking system to retain full braking ability.

2. The vehicle braking system according to claim 1, wherein the vehicle includes four wheels, and wherein each of the first and second subsets includes two of the four wheels.

3. The vehicle braking system according to claim 2, wherein the two wheels of the first subset are disposed diagonally at opposite corners of the vehicle and are different from the two wheels of the second subset.

4. The system according to claim 1, wherein each of the first and second dissipation devices includes an electrical dissipation resistor.

5. The system according to claim 1, wherein the vehicle has a mass of M kg, and wherein each of the first and second dissipation devices is of a power greater than $250*M/1000$ kW per sub-system.

6. The system according to claim 1, wherein an electrical energy source is connected to the central electric line.

7. The system according to claim 1, wherein an electrical energy storage device is connected to the central electric line by an electronic regeneration module.

8. The system according to claim 1, wherein the system forms a self-contained electrical system, with no electrical power being received from or transferred to outside the vehicle.

9. The system according to claim 1, further comprising a central unit for ensuring management of a vehicle longitudinal displacement, the central unit controlling all of the first and second electronic wheel control modules, the central unit having a vehicle braking operating mode activated by a vehicle braking control signal of a given amplitude representative of a total braking force desired for the vehicle and in which, in a braking mode, at whatever amplitude of the braking control signal, the central unit controls all of the first and second electronic wheel control modules in such a way that a sum of longitudinal forces of all of the at least two wheels originating from the rotary electric machines is a function of the amplitude of the braking control signal.

10. The system according to claim 1, wherein no mechanical service brake is included on any of the at least two wheels.

11. The system according to claim 1, wherein the central electric line is connected to first a first power source and a second power source.

12. The system according to claim 11, wherein the first power source is a voltage converter.

13. The system according to claim 11, wherein the first power source is a voltage converter and the second power source is a battery.

14. The system according to claim 11, further comprising an electronic regeneration module and an assembly of supercapacitors connected to the central electric line.

* * * * *